US011163439B2

(12) United States Patent
Tanabe et al.

(10) Patent No.: US 11,163,439 B2
(45) Date of Patent: Nov. 2, 2021

(54) ELECTRONIC DEVICE, CONTROL METHOD, AND RECORDING MEDIUM USED IN A VEHICLE

(71) Applicant: KYOCERA Corporation, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/839,709

(22) Filed: Apr. 3, 2020

(65) Prior Publication Data
US 2020/0333947 A1 Oct. 22, 2020

(30) Foreign Application Priority Data

Apr. 17, 2019 (JP) .............................. JP2019-078859

(51) Int. Cl.
G06F 3/0488 (2013.01)
G06T 3/40 (2006.01)
(52) U.S. Cl.
CPC ............ G06F 3/04883 (2013.01); G06T 3/40 (2013.01); G06F 2203/04803 (2013.01); G06T 2200/24 (2013.01)
(58) Field of Classification Search
CPC ...... G06F 3/048; G06F 3/0487; G06F 3/0488; G06F 3/04883; G06F 2203/048; G06F 2203/04803; G06T 3/00; G06T 3/40; G06T 2200/00; G06T 2200/24

USPC .......................................................... 715/863
See application file for complete search history.

(56) References Cited

U.S. PATENT DOCUMENTS

| 10,416,778 | B2* | 9/2019 | Kim | H04N 5/23219 |
| 2007/0078601 | A1* | 4/2007 | Nakano | B60W 30/16 701/301 |
| 2008/0074384 | A1* | 3/2008 | Orr | G06F 1/1626 345/156 |
| 2011/0106365 | A1* | 5/2011 | Miyake | B60K 35/00 701/31.4 |
| 2011/0106367 | A1* | 5/2011 | Oda | G07C 5/085 701/31.4 |
| 2013/0303106 | A1* | 11/2013 | Martin | H04W 4/027 455/404.2 |
| 2014/0309806 | A1* | 10/2014 | Ricci | G06F 21/32 701/1 |

(Continued)

FOREIGN PATENT DOCUMENTS

| CN | 106055197 A | * | 10/2016 |
| CN | 106919303 A | * | 7/2017 |
| JP | 2011-169860 A | | 9/2011 |

Primary Examiner — Reza Nabi
Assistant Examiner — Hwei-Min Lu
(74) Attorney, Agent, or Firm — Studebaker & Brackett PC

(57) ABSTRACT

An electronic device mountable in a car includes a first sensor configured to detect a gesture that does not come into contact with the electronic device, a second sensor configured to detect a touch that comes into contact with the electronic device, and a controller. The controller is configured to reduce the size of icons, displayed on a display, when detection by the first sensor is enabled and the car is moving.

14 Claims, 17 Drawing Sheets

(56) References Cited

U.S. PATENT DOCUMENTS

| | | | |
|---|---|---|---|
| 2015/0268746 A1* | 9/2015 | Cuddihy | G06F 3/041 |
| | | | 345/173 |
| 2016/0349850 A1* | 12/2016 | Tsuda | G06F 3/017 |
| 2017/0228035 A1* | 8/2017 | Irzyk | G02B 27/0093 |
| 2018/0157329 A1* | 6/2018 | Salter | G06F 3/017 |
| 2018/0217717 A1 | 8/2018 | Yasuda et al. | |
| 2019/0196679 A1* | 6/2019 | You | G06F 3/0484 |
| 2020/0225666 A1* | 7/2020 | Lee | G01C 21/367 |

* cited by examiner

ELECTRONIC DEVICE, CONTROL METHOD, AND RECORDING MEDIUM USED IN A VEHICLE

CROSS-REFERENCE TO RELATED APPLICATION

The present application claims priority to and the benefit of Japanese Patent Application No. 2019-078859 filed Apr. 17, 2019, the entire contents of which are incorporated herein by reference.

TECHNICAL FIELD

The present disclosure relates to an electronic device, a control method, and a recording medium.

BACKGROUND

An apparatus for supporting driving of a vehicle by a user is known. For example, a car navigation system mounted in a vehicle is known. Such a car navigation system supports driving of the vehicle by displaying information related to the route to the destination, for example, on a display.

SUMMARY

An electronic device according to an embodiment is mountable in a car. The electronic device includes a first sensor configured to detect a gesture that does not come into contact with the electronic device, a second sensor configured to detect a touch that comes into contact with the electronic device, and a controller. The controller is configured to reduce a size of an icon, displayed on a display, when detection by the first sensor is enabled and the car is moving.

A control method according to an embodiment is a control method of an electronic device mountable in a car. The control method includes detecting a gesture that does not come into contact with the electronic device, detecting a touch that comes into contact with the electronic device, and reducing a size of an icon, displayed on a display, when detection of the gesture is enabled and the car is moving.

A non-transitory computer-readable recording medium according to an embodiment stores computer program instructions, which when executed cause an electronic device mountable in a car to detect a gesture that does not come into contact with the electronic device, detect a touch that comes into contact with the electronic device, and reduce a size of an icon, displayed on a display, when detection of the gesture is enabled and the car is moving.

DETAILED DESCRIPTION

In terms of vehicle driving safety, it is preferable that the driver avoid performing touch operations while driving. The present disclosure relates to providing an electronic device, a control method, and a recording medium that can improve the driving safety of a moveable body. Embodiments of the present disclosure can provide an electronic device, a control method, and a recording medium that can improve the driving safety of a moveable body.

(Electronic Device Configuration)

Figure 1:
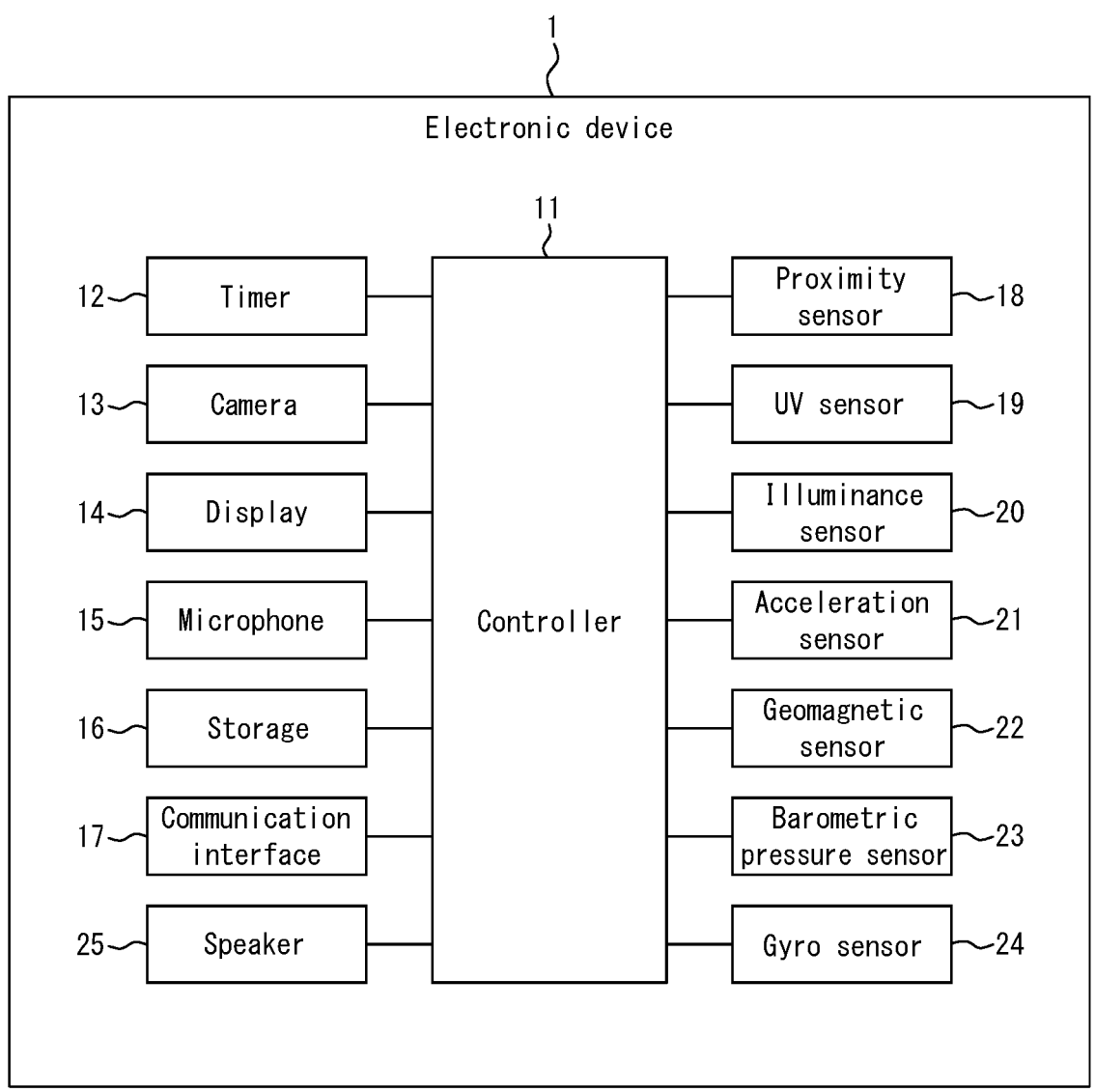
FIG. 1 illustrates the schematic configuration of an electronic device according to an embodiment.

As illustrated in FIG. 1, an electronic device 1 according to an embodiment includes a controller 11, a timer 12, a camera 13, a display 14, a microphone 15, a storage 16, a communication interface 17, a proximity sensor 18 (gesture sensor), and a speaker 25. The electronic device 1 further includes a UV sensor 19, an illuminance sensor 20, an acceleration sensor 21, a geomagnetic sensor 22, a barometric pressure sensor 23, and a gyro sensor 24. FIG. 1 is only an example, and a portion of the components in FIG. 1 may be omitted from the electronic device 1. Also, the electronic device 1 may include components other than those illustrated in FIG. 1.

The electronic device 1 may be implemented as various devices used in driving or piloting of a moveable body. The moveable body may be configured by any apparatus capable of movement. The moveable body may be boardable by the user. The moveable body may, for example, encompass vehicles, ships, aircraft, and the like. The vehicles may, for example, include electric cars, hybrid electric cars, gasoline cars, motorcycles, bicycles, welfare vehicles, and the like. The vehicles may include railway vehicles. The moveable body may be driven or piloted by the user. At least a portion of user operations related to driving or piloting of the moveable body may be automated. The moveable body is not limited to user operation and may move independently. The moveable body is described below as being a car driven by a user.

When the moveable body is a car, the electronic device 1 may be implemented as an in-vehicle device such as a car navigation system mounted in the car. The electronic device 1 may, for example, be implemented as a mobile phone, a phablet, a tablet personal computer (PC), a smartphone, a feature phone, or the like. In this case, the electronic device 1 may be connected in a wired or wireless manner to allow communication with a system mounted in the car that the user is driving. For example, the electronic device 1 may be implemented as a smartphone and connected via Bluetooth® (Bluetooth is a registered trademark in Japan, other countries, or both) to allow communication with a system mounted in the car. The electronic device 1 is not limited to these examples and may be implemented as any device used for driving or piloting of the moveable body. For example, the electronic device 1 may be implemented as a personal digital assistant (PDA), a remote control, a portable music player, a game device, an e-book reader, a household appliance, an industrial device, i.e. a factory automation (FA) device, or the like.

The electronic device 1 according to an embodiment is described below as being implemented as a car navigation system mountable in a car. In this case, the electronic device 1 may be a dedicated terminal configured as a car navigation system. The electronic device 1 may instead be configured as a typical smartphone, for example, as described above. Stating that the electronic device is "mountable in a car" is not limited to the electronic device 1 being installed in a fixed manner in a car but also to the electronic device 1 being placed on the dashboard of a car, for example. In this case, the electronic device 1 is not only mountable in a car but is also envisioned as being carried out of the car and used.

The timer 12 receives an instruction for timer operation from the controller 11. When a predetermined time has elapsed, the timer 12 outputs a signal indicating the elapse to the controller 11. The timer 12 may be provided independently from the controller 11, as illustrated in FIG. 1, or be internal to the controller 11.

The camera 13 captures images of subjects around the electronic device 1. The camera 13 is, for example, provided on the surface where the display 14 of the electronic device 1 is provided. The camera 13 may, for example, be configured to include an imaging element that performs photoelectric conversion, such as a charge coupled device (CCD) sensor or a complementary metal oxide semiconductor (CMOS) sensor.

The display 14 displays screens. A screen includes at least one of characters, images, symbols, graphics, or the like, for example. The display 14 may be a liquid crystal display, an organic electro-luminescence panel, an inorganic electroluminescence panel, or the like. In the present embodiment, the display 14 is a touch panel display (touchscreen display). The touch panel display detects contact by a finger, a stylus pen, or the like and identifies the contact position. The display 14 can simultaneously detect a plurality of positions contacted by fingers, stylus pens, or the like.

The microphone 15 detects sound around the electronic device 1, including people's voices. The microphone 15 may convert sound detected as air vibration by a diaphragm, for example, to an electric signal.

The storage 16 functions as a memory storing programs and data. The storage 16 temporarily stores the processing results of the controller 11. The storage 16 may include any appropriate storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing corresponding to a gesture. The control program is, for example, an operating system (OS). The applications and the control program may be installed in the storage 16 through communication by the communication interface 17 or from a storage medium.

The communication interface 17 is for communicating over a wired or wireless connection. The communication method of the communication interface 17 in an embodiment is prescribed by a wireless communication standard. For example, wireless communication standards include cellular phone communication standards such as 2G, 3G, 4G, and 5G. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Examples of wireless communication standards include worldwide interoperability for microwave access (WiMAX), IEEE802.11, Bluetooth®, infrared data association (IrDA), and near field communication (NFC). The communication interface 17 may support one or more of the aforementioned communication standards.

The speaker 25 outputs sound. For example, the speaker 25 outputs audio to guide the way to an inputted destination of the car. When the electronic device 1 is implemented as a device capable of making phone calls, the speaker 25 may, for example, output the other party's voice during a phone call. When, for example, the news, a weather forecast, or the like is to be read, the speaker 25 may output the content thereof as sound or voice.

Without contact, the proximity sensor 18 detects the relative distance to an object around the electronic device 1, the movement direction of the object, and the like. In the present embodiment, the proximity sensor 18 includes one infrared light emitting diode (LED) acting as a light source and four infrared photodiodes. The proximity sensor 18 emits infrared light, from the infrared LED acting as a light source, towards an object. Reflected light from the object is incident on the infrared photodiodes of the proximity sensor 18. The proximity sensor 18 can measure the relative distance to the object based on the output current of the infrared photodiodes. The proximity sensor 18 also detects the movement direction of the object by the difference in time at which reflected light from the object is incident on each of the infrared photodiodes. The proximity sensor 18 can thus detect an operation by an air gesture (gesture) that the user of the electronic device 1 performs without touching the electronic device 1. The proximity sensor 18 may include visible light photodiodes.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by controlling overall operation of the electronic device 1.

When the electronic device 1 is implemented as a car navigation system mounted in a car, the controller 11 of the electronic device 1 may, for example, be configured by an electric control unit or engine control unit (ECU) included in the car.

The controller 11 refers as necessary to data stored in the storage 16. The controller 11 implements a variety of functions by executing instructions included in programs stored in the storage 16 to control other functional components, such as the display 14. For example, the controller 11 acquires information on a user gesture detected by the proximity sensor 18. When the car is stopped, and the electronic device 1 is operable by a touch panel, for example, the controller 11 acquires data on contact by the user from the touch panel. The controller 11 also acquires information detected by sensors other than the proximity sensor 18, for example.

In the present embodiment, the controller 11 functions as a display driver that controls display of the display 14. The controller 11 in the present embodiment can, in other words, display images by directly controlling the display 14. As another embodiment, a display driver may be provided independently from the controller 11. In this case, the controller 11 may display images on the display 14 via the display driver.

The UV sensor 19 can measure the amount of ultraviolet light included in sunlight or other light.

The illuminance sensor 20 detects the illuminance from surrounding light that is incident on the illuminance sensor 20.

The acceleration sensor 21 detects the direction and magnitude of acceleration acting on the electronic device 1. The acceleration sensor 21 is, for example, a three-axis (3D) sensor that detects acceleration in the x-axis, y-axis, and z-axis directions. The acceleration sensor 21 may, for example, be a piezoresistive sensor or a capacitive sensor.

The geomagnetic sensor 22 can measure the orientation of the electronic device 1 by detecting the orientation of the earth's magnetic field.

The barometric pressure sensor 23 detects the barometric pressure (atmospheric pressure) outside of the electronic device 1.

The gyro sensor 24 detects the angular velocity of the electronic device 1. The controller 11 can measure the change in orientation of the electronic device 1 by integrating the angular velocity, acquired by the gyro sensor 24, over time.

(Gesture-Based Operation of Electronic Device)

Figure 2:
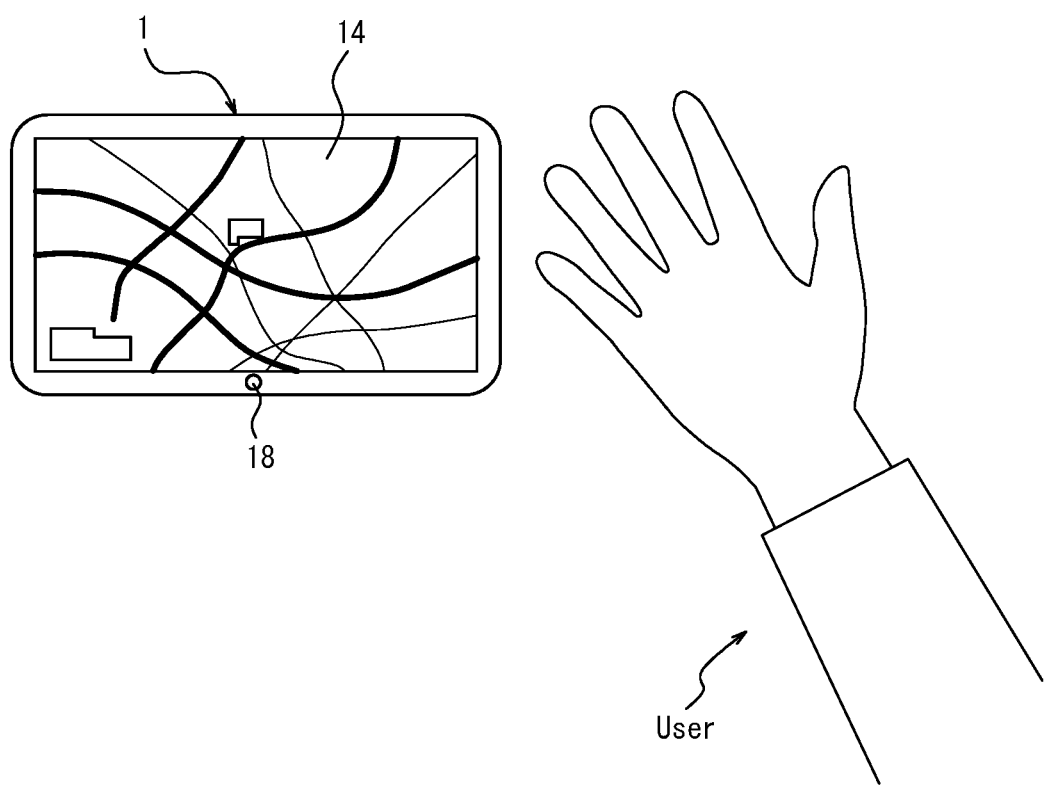
FIG. 2 illustrates a user operating an electronic device with a gesture.

FIG. 2 illustrates the user operating the electronic device 1 with a gesture. The electronic device 1 is, for example, mounted in a car so that the display 14 is installed in the console. Alternatively, the electronic device 1 may be held by a support provided inside the car to support the electronic device 1. Upon the proximity sensor 18 detecting a gesture by the user, the controller 11 executes processing based on the detected gesture. In the example in FIG. 2, the gesture-based processing is for adjusting the volume of sound being outputted by the speaker 25, for example. When the user performs a gesture to move the hand upward relative to the electronic device 1, for example, the electronic device 1 increases the volume in conjunction with the movement of the user's hand. When the user performs a gesture to move the hand downward relative to the electronic device 1, for example, the electronic device 1 decreases the volume in conjunction with the movement of the user's hand.

The gesture-based processing is not limited to adjustment of the volume. The gesture-based processing may be a different type of processing executable based on a detected gesture. For example, the gesture-based processing may be to enlarge or reduce the information displayed on the display 14, to adjust the brightness of the display on the display 14, to start reading predetermined information aloud, to stop reading predetermined information aloud, or the like.

(Gesture Detection Method)

Figure 3:
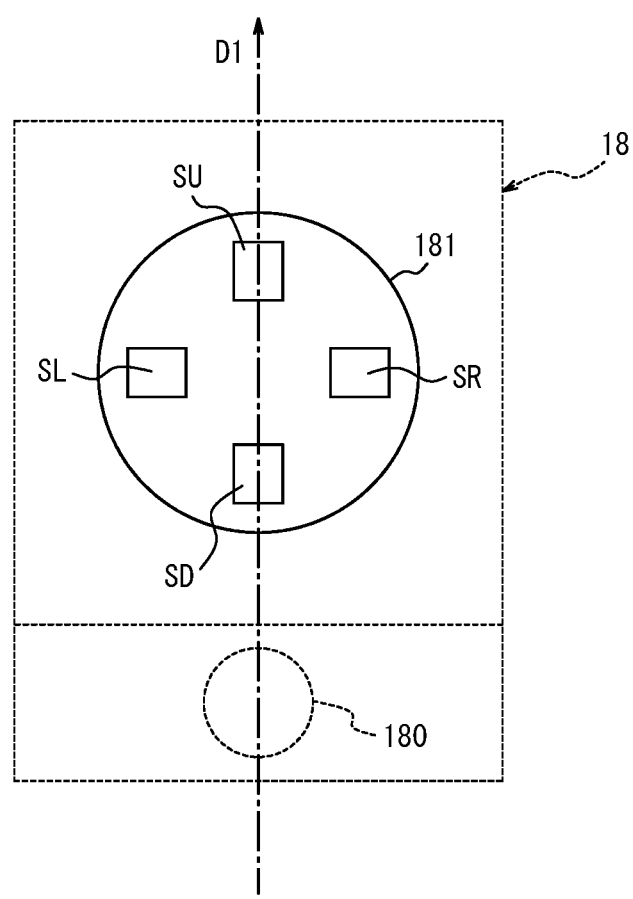
FIG. 3 is a configuration diagram of a proximity sensor.

A method performed by the controller 11 to detect a gesture by the user on the basis of output of the proximity sensor 18 is described below in detail with reference to FIGS. 3 and 4. FIG. 3 illustrates an example configuration of the proximity sensor 18 when the electronic device 1 is viewed from the front. The proximity sensor 18 includes an infrared LED 180 acting as a light source and four infrared photodiodes SU, SR, SD, SL. The four infrared photodiodes SU, SR, SD, SL detect reflected light from a detection target through a lens 181. The four infrared photodiodes SU, SR, SD, and SL are arranged symmetrically around the center of the lens 181. The infrared photodiode SU and the infrared photodiode SD are placed apart on an imaginary line D1 in FIG. 3. The infrared photodiodes SR and SL are placed between the infrared photodiode SU and the infrared photodiode SD in the direction of the imaginary line D1 in FIG. 3.

Figure 4:
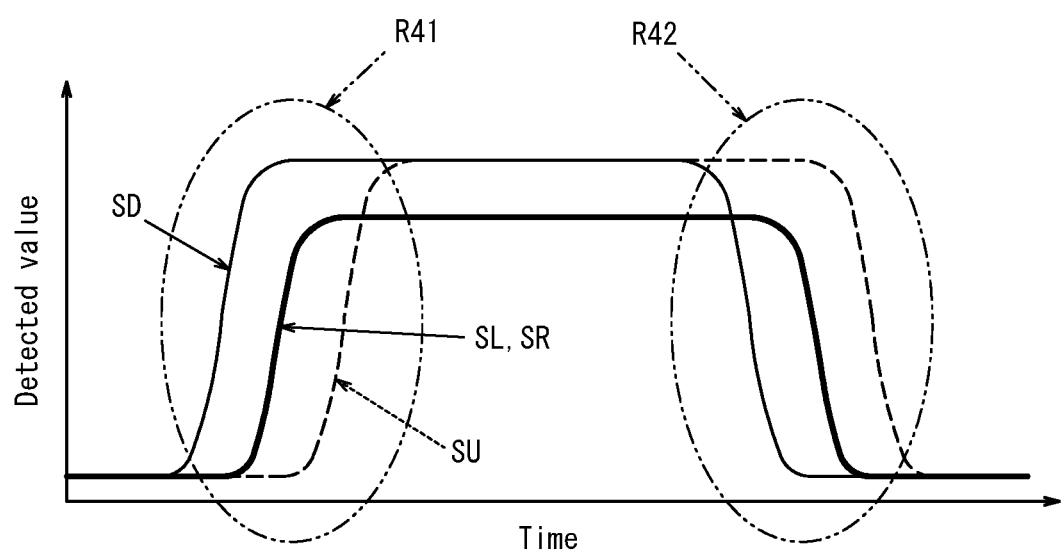
FIG. 4 illustrates the change over time in the value detected by each infrared photodiode.

FIG. 4 illustrates the change over time in the value detected by the four infrared photodiodes SU, SR, SD, and SL as the detection target (for example, the user's hand) moves in the direction of the imaginary line D1 in FIG. 3. The infrared photodiode SD and the infrared photodiode SU are separated the most in the direction of the imaginary line D1. Hence, as illustrated in FIG. 4, the time difference is greatest between the same change (for example, increase) in the value detected by the infrared photodiode SD (thin, solid line) and the change (for example, increase) in the value detected by the infrared photodiode SU (dashed line). By recognizing a predetermined time difference in the change in the values detected by the photodiodes SU, SR, SD, SL, the controller 11 can judge the movement direction of the detection target.

The controller 11 acquires the values detected by the photodiodes SU, SR, SD, SL from the proximity sensor 18. To recognize movement by the detection target in the direction of the imaginary line D1, for example, the controller 11 may integrate the result of subtracting the value detected by the photodiode SU from the value detected by the photodiode SD over a predetermined time. In the example in FIG. 4, the integral value in regions R41 and R42 is non-zero. From the change in the integral value (for example, a positive, zero, or negative change), the controller 11 can recognize movement of the detection target in the direction of the imaginary line D1.

The controller 11 may also integrate the result of subtracting the value detected by the photodiode SR from the value detected by the photodiode SL over a predetermined time. From the change in the integral value (for example, a positive, zero, or negative change), the controller 11 can recognize movement of the detection target in a direction orthogonal to the imaginary line D1.

Alternatively, the controller 11 may perform calculations using all of the detected values of the photodiodes SU, SR, SD, SL. In other words, the controller 11 may recognize the movement direction of the detection target without performing calculations after division into components in the direction of the imaginary line D1 and the orthogonal direction thereto.

The detected gesture may be a left or right gesture, an up or down gesture, a diagonal gesture, a gesture to trace a circle clockwise, a gesture to trace a circle counterclockwise, or other such gesture. The left or right gesture is, for example, performed in a direction substantially parallel to the longitudinal direction of the electronic device 1 illustrated in FIG. 2. The up or down gesture is, for example, performed in a direction substantially parallel to the transverse direction of the electronic device 1 illustrated in FIG. 2. The diagonal gesture is performed in a plane substantially parallel to the electronic device 1 illustrated in FIG. 2, in a direction not parallel to either the longitudinal direction or the transverse direction of the electronic device 1.

The photodiodes SU, SR, SD, SL can receive reflected light that is a reflection by the detection target of infrared light irradiated by the infrared LED 180 acting as a light source and can output a detected value of a magnitude corresponding to the amount of received light. At this time, the controller 11 can judge whether the detection target has moved closer to or farther away from the proximity sensor 18. First, the controller 11 can judge that the detection target is present when at least one detection value of the photodiodes SU, SR, SD, SL is equal to or greater than a threshold (for example, a value other than zero). After judging that the detection target is present, the controller 11 can judge that the detection target is moving closer to the electronic device 1 when at least one detection value of the photodiodes SU, SR, SD, SL becomes relatively large. After judging that the detection target is present, the controller 11 can judge that the detection target is moving away from the electronic device 1 when at least one detection value of the photodiodes SU, SR, SD, SL becomes relatively small. At this time, the controller 11 can distinguish a gesture by the user to move a hand towards the electronic device 1, a gesture to move a hand away, and a gesture that combines these gestures with the aforementioned other gestures (such as a left or right gesture).

As described above, the electronic device 1 according to an embodiment includes a first sensor (gesture sensor), such as the proximity sensor 18, that detects a gesture that does not come into contact with the electronic device 1. As described above, the electronic device 1 according to an embodiment also includes a second sensor (touch sensor), such as the display 14 (touch panel display/touchscreen display), that detects a touch on the electronic device 1. The sensor that detects a gesture that does not come into contact with the electronic device 1, such as the proximity sensor 18, is referred to below as the first sensor or the gesture sensor as appropriate. The sensor that detects a touch on the electronic device 1, such as the display 14, is referred to below as the second sensor or the touch sensor as appropriate.

(Car Mode)

Figure 5:
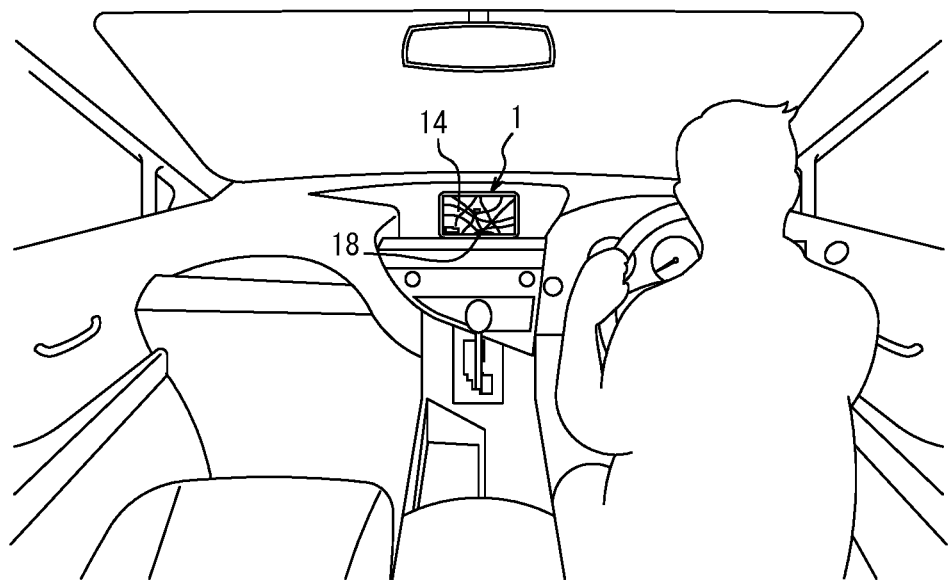
FIG. 5 illustrates an example of conditions in which an electronic device is operated with a gesture.

FIG. 5 illustrates example conditions in which the user operates the electronic device 1 with a gesture. As illustrated in FIG. 5, the electronic device 1 is disposed so that the display 14 is positioned in the central region of the console of the car, for example. In the example illustrated in FIG. 5, the user boards the car in which the electronic device 1 is mounted and drives the car while referring to the route to the destination while the route is displayed on the display 14 of the electronic device 1. The proximity sensor 18 is in a state capable of detecting a gesture by the user at this time. The controller 11 executes processing based on the gesture detected by the proximity sensor 18.

For example, the controller 11 can execute processing to adjust the volume of sound outputted from the electronic device 1 in accordance with a particular gesture (such as a gesture in which the user moves a hand up or down). The electronic device 1 can receive a touch operation (input) from the user on the touchscreen display. If the user attempts to perform a touch operation while driving, however, he may divert his gaze to the display 14 for a long time to confirm the distance to the touchscreen display and the contact position. Even if at least a portion of user operation related to driving is automated, it is still preferable, in terms of vehicle driving safety, that the driver continue to confirm the conditions surrounding the car during driving. In other words, the user preferably does not perform a touch operation during driving. When the electronic device 1 can receive input operation by gesture as in the present embodiment, the user can perform an input operation without touching the electronic device 1. This makes it easier to guarantee driving safety even when the user performs input operation while driving.

The electronic device 1 may have a plurality of modes. Modes refer to operation modes (operation states or operation statuses) that, for example, place restrictions on the operations of the entire electronic device 1. The modes may be operation modes that add predetermined functions to the operations of the electronic device 1 or remove restrictions related to predetermined functions. The electronic device 1 may be configured for selection of only one mode at a time. In the present embodiment, the modes of the electronic device 1 may include a first mode and a second mode. The first mode may be a regular operation mode (regular mode) suitable for use in circumstances other than diving, for example. Circumstances other than driving may, for example, include any of a state in which the car engine is not on, a state in which the shift lever is in a predetermined range (such as a parking range), a state in which the brake pedal is depressed, and a state in which the path to the destination is not being displayed. The second mode may be an operation mode (car mode) of the electronic device 1 suitable for driving of the vehicle while the path to the destination is displayed on the display 14 of the electronic device 1.

As described above, input can preferably be provided by gestures in the second mode. In other words, when the mode of the electronic device 1 switches to the second mode, the proximity sensor 18 preferably operates in accordance with the switching to allow detection of a gesture. The mode of the electronic device 1 may be switched based on a predetermined input operation by the user on the electronic device 1 or a predetermined input operation on the car.

Various other modes may be set in the electronic device 1 other than the above-described modes. For example, a mode in which predetermined functions are enabled may be set as the first mode, and modes other than the first mode may be the second mode. In this case, the second mode may be the "regular mode", for example.

In the electronic device 1, a mode for detecting a gesture with the proximity sensor 18, without contact on the electronic device 1, and a mode for detecting a touch on the electronic device 1 with the display 14 may be set. In this case, the electronic device 1 may operate by switching between these modes exclusively or may have a temporal overlap between at least a portion of these modes.

Furthermore, at least one of a mode for detecting only the above-described gestures, a mode for detecting only the above-described touch, and a mode for detecting both the above-described gestures and touch may be set on the electronic device 1.

Next, the operations of the electronic device 1 according to an embodiment are described.

Figure 6:
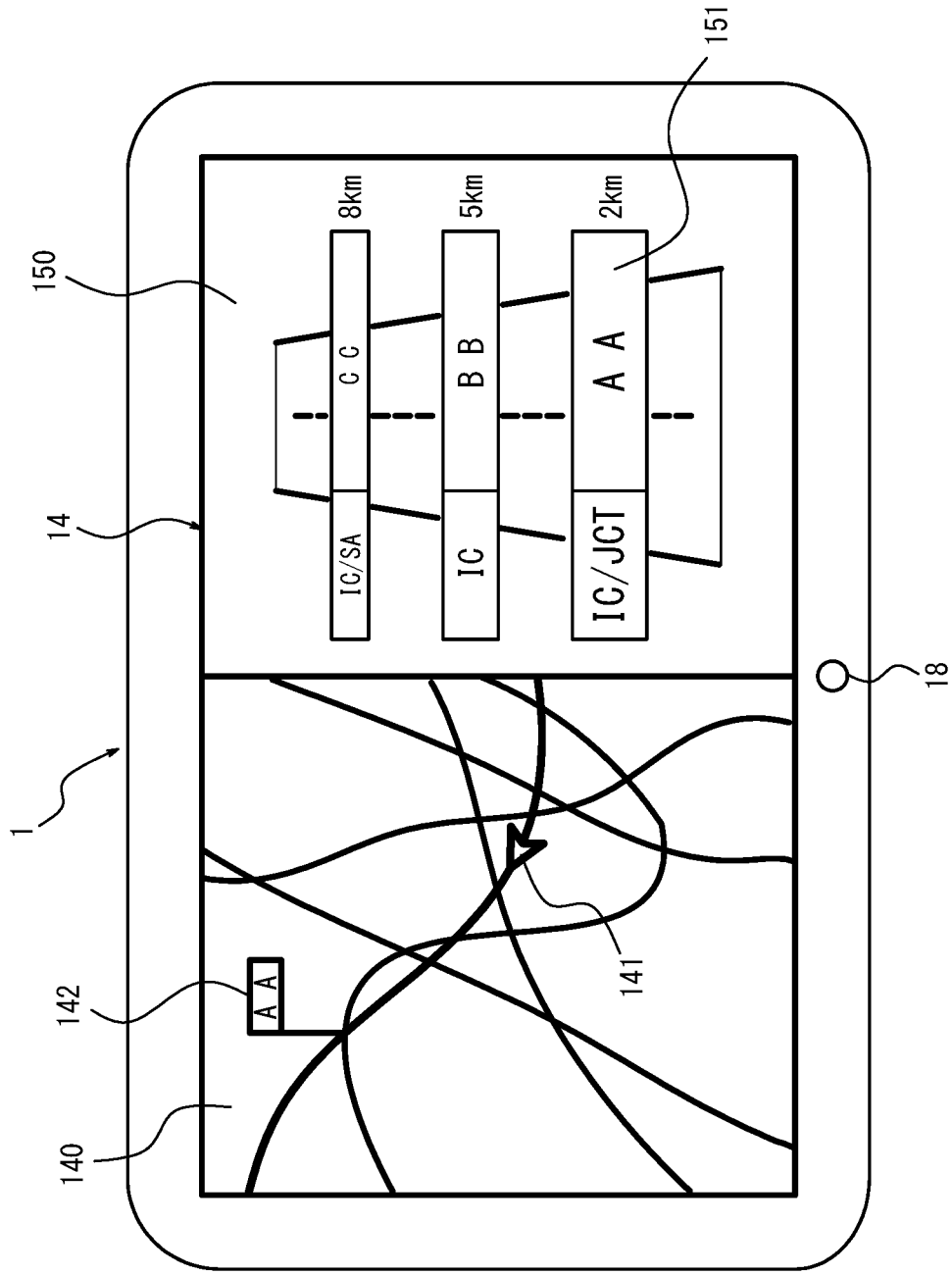
FIG. 6 illustrates an example display screen of an electronic device.

FIG. 6 is an example of a display on the display 14 of the electronic device 1. A first screen 140 is, for example, a map screen and includes roads, a mark 141 indicating the current position and orientation of the car, and a mark 142 indicating an interchange (IC), building, or the like. A second screen 150 is, for example, a road information screen indicating information of a highway and includes detailed information 151 of interchanges near the current position. The detailed information includes interchange names (for example, AA, BB, CC). The detailed information 151 also includes information on whether a service area (SA) or junction (JCT) is located near an interchange (IC). In the example in FIG. 6, a service area is indicated as being near an interchange CC. The detailed information 151 also includes the distance from the current position to each interchange. In the example in FIG. 6, the distance to interchange BB is indicated as 5 km.

The electronic device 1 can thus perform similar display on the display 14 as a known car navigation system. The electronic device 1 can also display various information to notify the user on the display 14 that displays a screen such as the example in FIG. 6. Furthermore, the electronic device 1 can display various icons for the user to operate on the display 14 that displays a screen such as the example in FIG. 6.

As described above, when the user performs a touch operation (input) on the electronic device 1, the user tends to gaze at the display 14 to confirm the distance to the touchscreen display and the contact position. In terms of vehicle driving safety, a user who is a driver preferably does not perform a touch operation on the display 14 while driving the vehicle. In light of these circumstances, the electronic device 1 according to an embodiment provides conditions such that a user who is driving a car in which the electronic device 1 is mounted feels less motivated to perform a touch operation on the display 14.

The "user" of the electronic device 1 is typically the driver of a car in which the electronic device 1 is mounted. The user of the electronic device 1 is not, however, limited to the driver of the car in which the electronic device 1 is mounted and may be another person, other than the driver, riding in the car in which the electronic device 1 is mounted. The electronic device 1 may judge whether the user who provides gesture-based input and/or touch-based input is the driver. In this case, the electronic device 1 may execute different processing depending on whether the user who provides gesture-based input and/or touch-based input is the driver.

Figure 7:
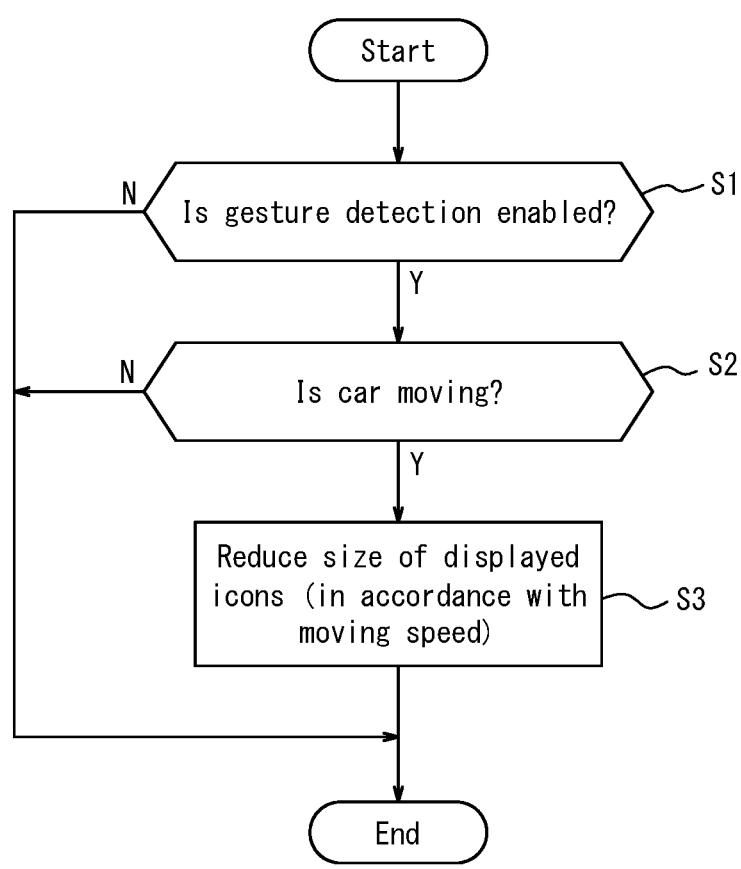
FIG. 7 is a flowchart illustrating an example of processing executed by a controller of an electronic device.

FIG. 7 is a flowchart illustrating an example of processing executed by the controller 11 of the electronic device 1 according to an embodiment.

After the processing in FIG. 7 starts, the controller 11 judges whether detection of a gesture by the proximity sensor 18 (gesture sensor) is enabled (step S1). In step S1, the gesture detection being enabled refers, for example, to the detection of a user gesture by a gesture sensor such as the proximity sensor 18 being enabled. Here, the detection of a gesture by the user with a gesture sensor being "enabled" may refer to a state in which the sensor can detect a predetermined gesture by the user, and the controller 11 can execute predetermined processing in accordance with the detection result.

When the gesture detection is not enabled in step S1, the controller 11 ends the processing illustrated in FIG. 7. Conversely, when the gesture detection is enabled in step S1, the controller 11 judges whether the car in which the electronic device 1 is mounted is moving (step S2).

The controller 11 may judge whether the car is moving in step S2 based on information acquired from the ECU included in the car, for example. Alternatively, the controller 11 may judge in step S2 whether the car is moving based on information acquired from sensors or the like included in the car apart from the ECU, for example. The controller 11 may use any method in step S2 to judge whether the car in which the electronic device 1 is mounted is moving.

When the car is not moving in step S2, the controller 11 ends the processing in FIG. 7. Conversely, when the car is moving in step S2, the controller 11 reduces the size of icons displayed on the display 14 (step S3). The extent to which the size of the icons is reduced in step S3 may, for example, be stored in the storage 16 in advance. The extent to which the size of the icons is reduced may, for example, be the same for all of the icons or differ for each icon.

Figure 8A:
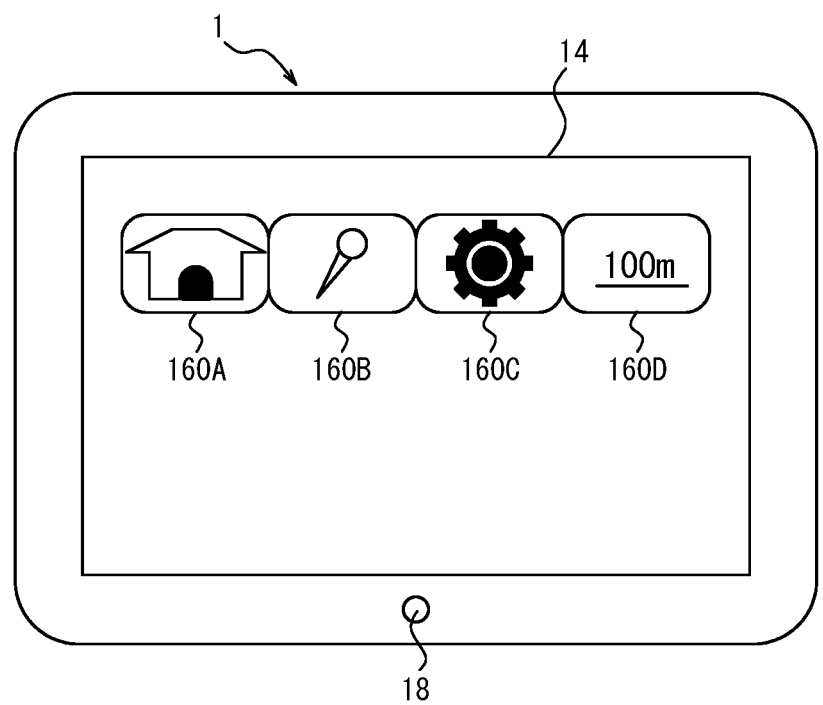
FIGS. 8A and 8B illustrate example display screens of an electronic device.
Figure 8B:
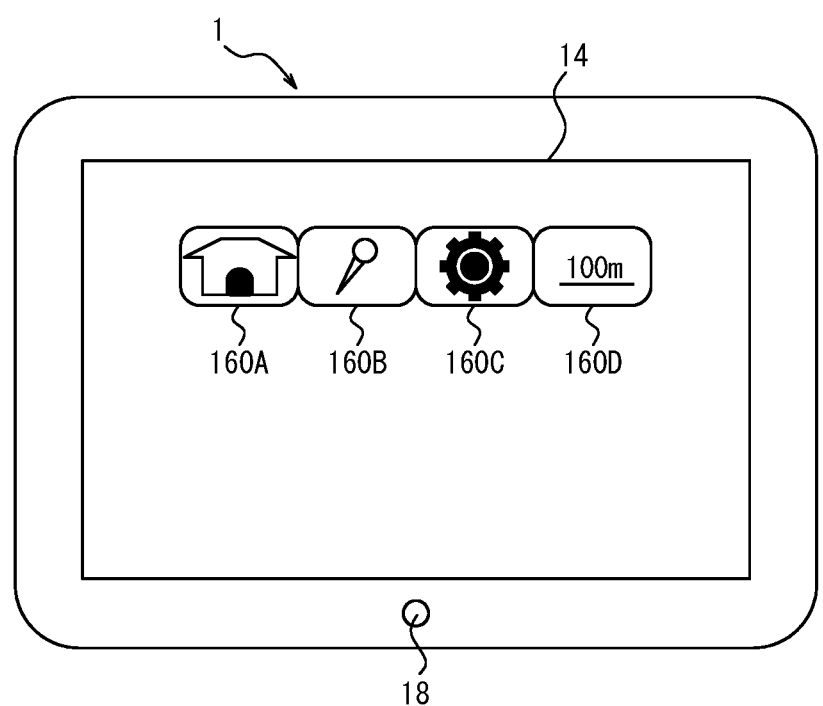

FIGS. 8A and 8B illustrate example display screens on the display 14 of the electronic device 1.

For example, suppose that a display screen such as FIG. 8A is displayed on the display 14 of the electronic device 1 in step S2 of FIG. 7. In FIG. 8A, an icon 160A, an icon 160B, an icon 160C, and an icon 160D are displayed in a row on the display 14 of the electronic device 1. When the car is not moving in step S2 (such as when the car is parked), for example, the controller 11 may maintain the display illustrated in FIG. 8A.

By selecting one of the icons 160A, 160B, 160C, 160D by gesture or touch, for example, the user can cause an associated function to be executed. In other words, by selecting one of the icons 160A through 160D with a gesture (without contact), the user can cause the function associated with that icon to be executed. The user can also select one of the icons 160A through 160D by touch (with contact) to cause the function associated with that icon to be executed.

In FIG. 8A, the icon 160A is associated with a function to display the user's home on the map screen. The icon 160B is associated with a function to register the current position or a designated position on the map screen. The icon 160C is associated with a function to display a settings menu. The icon 160D is associated with a function to designate the scale of the map screen. The icons illustrated in FIG. 8A are only examples, and various icons may be displayed as appropriate in accordance with the user's needs or wishes.

When the car is moving in step S2, for example, the controller 11 may change the display from the display in FIG. 8A to the display in FIG. 8B (step S3). As in FIG. 8A, the icons 160A, 160B, 160C, 160D are displayed in a row on the display 14 of the electronic device 1 in FIG. 8B. The icons 160A, 160B, 160C, 160D illustrated in FIG. 8B, however, are displayed smaller (reduced in size) than those illustrated in FIG. 8A.

When the icons 160A through 160D are displayed at a small size on the display 14 as illustrated in FIG. 8B, the user can select an icon with a gesture. In other words, by selecting one of the icons 160A through 160D with a gesture (without contact), the user can cause the function associated with that icon to be executed.

In this way, the controller 11 in the electronic device 1 according to an embodiment reduces the size of icons displayed on the display 14 when gesture detection by the first sensor is enabled and the car is moving. The electronic device 1 according to an embodiment reduces the size of icons displayed on the display 14 while the car is moving. The electronic device 1 according to an embodiment can therefore be expected to reduce the user's motivation for performing a touch operation on the display 14 while the car is moving. The electronic device 1 according to an embodiment can thereby improve the driving safety of a moveable body such as a car. With the electronic device 1 according to an embodiment, the user can perform gesture-based operation while the car is moving, without performing touch-based operation. Accordingly, the user is not particularly inconvenienced by the size of the icons displayed on the display 14 being reduced.

The order of steps S1 and S2 in FIG. 7 may be reversed. Steps S1 and S2 may be performed simultaneously (for example, in parallel). After completion of the processing in FIG. 7, the controller 11 may start the processing in FIG. 7 again immediately or at predetermined time intervals.

When displaying icons on the display 14 in step S3 of FIG. 7, the controller 11 may reduce the size of the icons in accordance with the moving speed of the car. For example, suppose that the icons 160A, 160B, 160C, 160D are displayed on the display 14 at the size illustrated in FIG. 8A when the car is not moving (parked or the like). Suppose also that the icons 160A, 160B, 160C, 160D are displayed on the display 14 at the size illustrated in FIG. 8B when the car is moving at 40 km/h, for example. The icons 160A, 160B, 160C, 160D may be displayed on the display 14 at an even smaller size than in FIG. 8B when the car is moving at 60 km/h, for example. On the other hand, the icons 160A, 160B, 160C, 160D may be displayed on the display 14 at a slightly larger size than in FIG. 8B when the car is moving at 20 km/h, for example. In this case as well, however, the icons 160A, 160B, 160C, 160D may be displayed on the display 14 at a smaller size than in FIG. 8A.

The controller 11 may thus reduce the size of icons displayed on the display 14 in accordance with the speed at which the car is moving.

Figure 9:
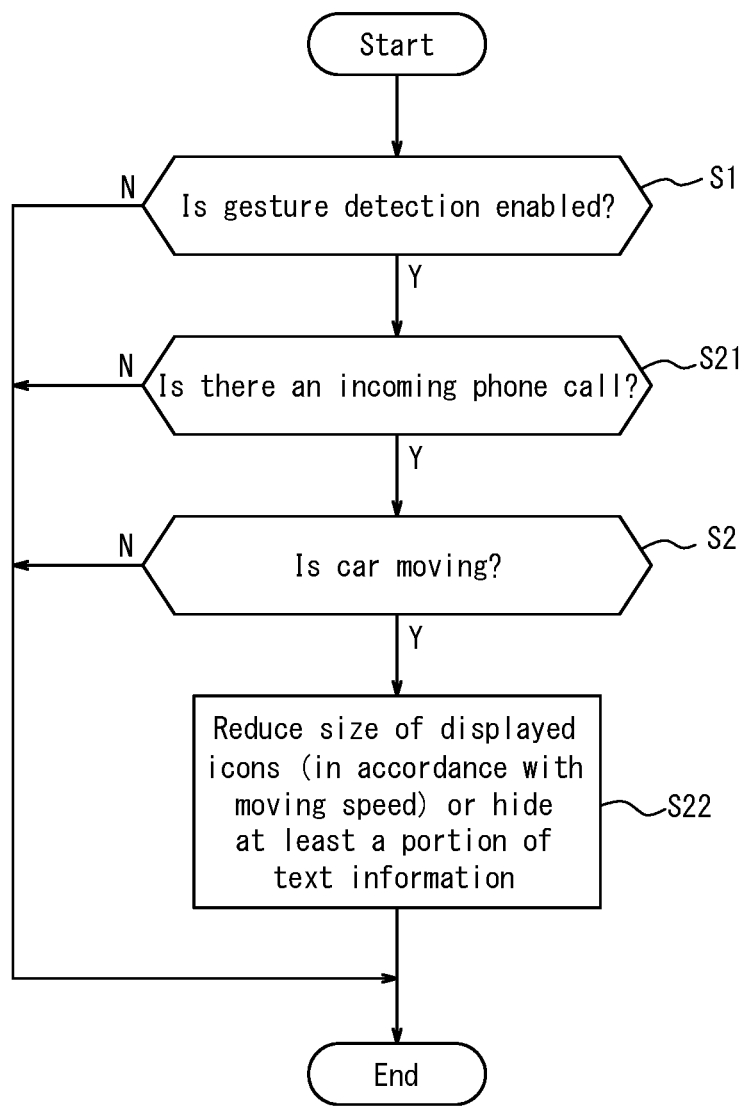
FIG. 9 is a flowchart illustrating an example of processing executed by a controller of an electronic device.

FIG. 9 is a flowchart illustrating another example of processing executed by the controller 11 of the electronic device 1 according to an embodiment. The processing in FIG. 9 can be executed by changing the processing described in FIG. 7.

After the processing in FIG. 9 starts, the controller 11 judges whether gesture detection by the proximity sensor 18 (gesture sensor) is enabled (step S1). When the gesture detection is not enabled in step S1, the controller 11 ends the processing illustrated in FIG. 9.

Conversely, when the gesture detection is enabled in step S1, the controller 11 judges whether there is an incoming phone call (step S21). In step S21, the controller may judge whether there is an incoming phone call from the control state of the communication interface 17, for example. The controller 11 may, however, judge whether there is an incoming phone call in step S21 with any method. When there is no incoming phone call in step S21, the controller 11 ends the processing in FIG. 9.

Conversely, when there is an incoming phone call in step S21, the controller 11 judges whether the car in which the electronic device 1 is mounted is moving (step S2). When the car is not moving in step S2, the controller 11 ends the processing in FIG. 9. When the car is moving in step S2, the controller 11 reduces the size of icons displayed on the display 14 (step S22).

The controller 11 may execute processing similar to the processing in step S3 of FIG. 7 in step S22. Instead of or in addition to the processing in step S3 of FIG. 7, the display 14 may be caused to hide at least a portion of text information in step S22. The display 14 may, for example, be caused to hide (e.g. to erase) at least a portion of the originally displayed text information in step S22. The display 14 may, for example, also be caused in step S22 to hide at least a portion of text information that should subsequently be displayed.

Figure 10A:
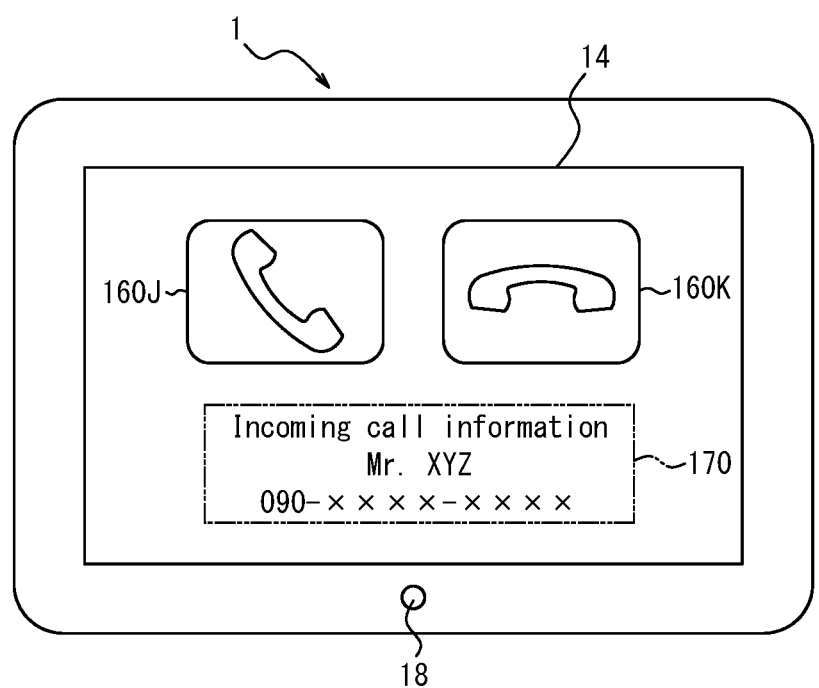
FIGS. 10A and 10B illustrate example display screens of an electronic device.
Figure 10B:
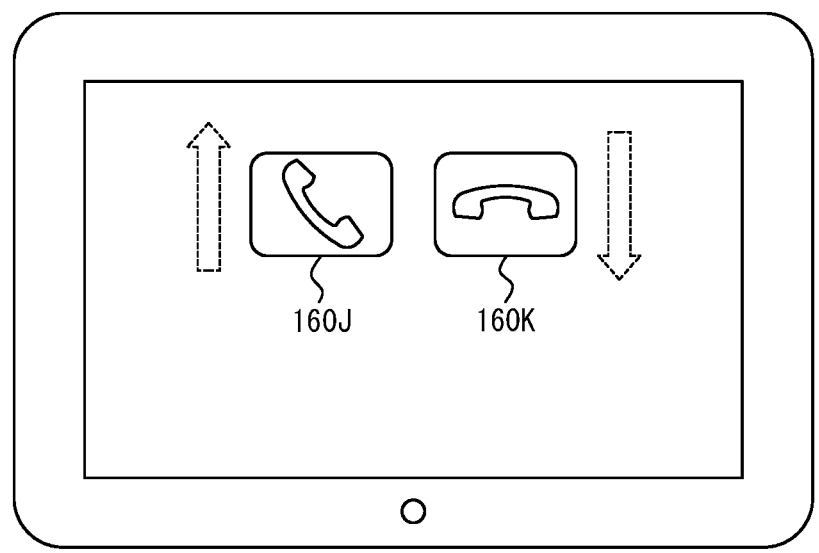

FIGS. 10A and 10B illustrate example display screens on the display 14 of the electronic device 1.

For example, suppose that the car is not moving (e.g. is parked) when there is an incoming call in step S21 of FIG. 9. In this case, the controller 11 causes the display 14 to display a notification for the user of the incoming phone call in step S22, as illustrated in FIG. 10A. FIG. 10A illustrates a call start icon 160J and an end call icon 160K being displayed on the display 14.

As illustrated in FIG. 10A, the controller 11 may display information related to the caller on the display 14 as text information 170. In the example illustrated in FIG. 10A, the text information 170 includes an indication of the incoming call ("Incoming call information"), the name of the caller ("Mr. XYZ"), and the phone number of the caller ("090-XXXX-XXXX"). The text information 170 in FIG. 10A is only an example. A portion thereof may be displayed, or other information may be included.

For example, with a gesture or a touch, the user can select the icon 160J or the icon 160K displayed on the display 14 as illustrated in FIG. 10A to execute the associated function. In this case, the controller 11 may start the phone call in accordance with selection of the icon 160J. The controller 11 may refuse to take the incoming phone call or end the call in accordance with selection of the icon 160K. In other words, by selecting the icon 160J or the icon 160K with a gesture (without contact), the user can cause the function associated with that icon to be executed. The user can also select the icon 160J or the icon 160K by touch (with contact) to cause the function associated with that icon to be executed.

Suppose instead that the car is moving when there is an incoming call in step S21 of FIG. 9. In this case, the controller 11 may reduce the size of icons displayed on the display 14 in step S22, as illustrated in FIG. 10B. The icon 160J and the icon 160K illustrated in FIG. 10 are displayed smaller (reduced in size) than the size illustrated in FIG. 10A. Furthermore, the text information 170 displayed in FIG. 10A may be hidden, as displayed in FIG. 10B. At least a portion of the text information 170 displayed in FIG. 10A may be hidden in this case.

When the icon 160J and icon 160K are displayed at a small size on the display 14 as illustrated in FIG. 10B, the user can select an icon with a gesture. In other words, by selecting the icon 160J or the icon 160K with a gesture (without contact), the user can cause the function associated with that icon to be executed.

A display suggesting gesture operations for the icon 160J and the icon 160K may be further provided, as illustrated in FIG. 10B. The arrow pointing upwards in FIG. 10B suggests that the icon 160J can be selected and the phone call started in response to an upward gesture. The arrow pointing downwards in FIG. 10B suggests that the icon 160K can be selected to refuse the incoming phone call or end the call in response to a downward gesture.

In this way, the controller 11 in the electronic device 1 according to an embodiment may reduce the size of icons displayed on the display 14 when the gesture detection by the first sensor is enabled and the car is moving at the time of an incoming call. Furthermore, at least a portion of text information on the display 14 may be hidden when the gesture detection by the first sensor is enabled and the car is moving at the time of an incoming call.

The electronic device 1 according to an embodiment reduces the size of icons displayed on the display 14 and hides at least a portion of text information while the car is moving. The electronic device 1 according to an embodiment can therefore be expected to reduce the user's motivation for performing a touch operation on the display 14 while the car is moving. The electronic device 1 according to an embodiment can thereby improve the driving safety of a moveable body such as a car. With the electronic device 1 according to an embodiment, the user can perform gesture-based operations while the car is moving, without performing touch-based operations. Accordingly, the user is not particularly inconvenienced by the size of the icons displayed on the display 14 being reduced.

Figure 11:
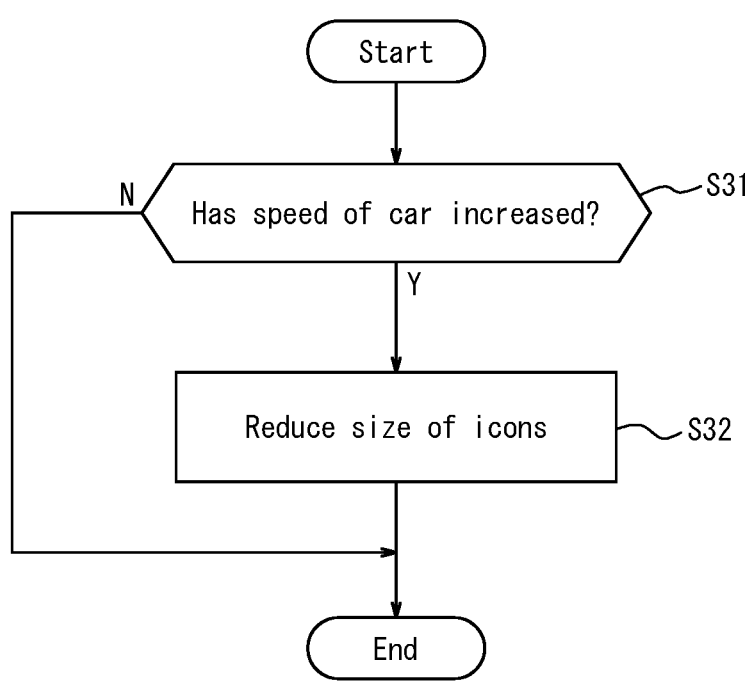
FIG. 11 is a flowchart illustrating an example of processing executed by a controller of an electronic device.

FIG. 11 is a flowchart illustrating another example of processing executed by the controller 11 of the electronic device 1 according to an embodiment. The processing in FIG. 11 can be executed following the processing described in FIGS. 7 and 9.

The processing in FIG. 11 further changes the size of icons in accordance with a change in the speed of the car after the icons are displayed at a small size by the processing in FIGS. 7 and 9.

When the processing in FIG. 11 begins, the controller 11 judges whether the speed of the car has increased (step S31). The controller 11 may judge a change in the speed of the car in step S31 based on information acquired from the ECU included in the car, for example. Alternatively, the controller 11 may judge a change in the speed of the car in step S31 based on information acquired from sensors or the like included in the car apart from the ECU, for example. The controller 11 may use any method in step S31 to judge a change in the speed of the car in which the electronic device 1 is mounted.

When the speed of the car has not increased in step S31, the controller 11 ends the processing in FIG. 11. Conversely, when the speed of the car has increased in step S31, the controller 11 (further) reduces the size of the icons displayed on the display 14. After completion of the processing in FIG. 11, the controller 11 may start the processing in FIG. 11 again immediately or at predetermined time intervals. The electronic device 1 thus reduces the size of the icons displayed on the display 14 with the processing in FIG. 11 as the speed of the car increases.

Assume, for example, that the icons 160A, 160B, 160C, 160D are displayed on the display 14 at the size illustrated in FIG. 8B when the car is moving at 40 km/h. In this case, if the speed of the car increases from 40 km/h to 60 km/h, for example, the icons 160A, 160B, 160C, 160D may be displayed on the display 14 at a smaller size than the size illustrated in FIG. 8B. The icons 160A, 160B, 160C, 160D may be displayed on the display 14 at an even smaller size when the speed of the car increases from 60 km/h to 80 km/h, for example.

The controller 11 in the electronic device 1 according to an embodiment may thus reduce the size of the icons displayed on the display 14 as the speed of the car increases. The electronic device 1 according to an embodiment can be expected to reduce the user's motivation for performing a touch operation on the display 14 while the car is moving. The electronic device 1 according to an embodiment can thereby improve the driving safety of a moveable body such as a car.

As a modification to the above-described embodiment, the electronic device 1 may increase the size of the icons displayed on the display 14 as the speed of the car decreases.

Figure 12:
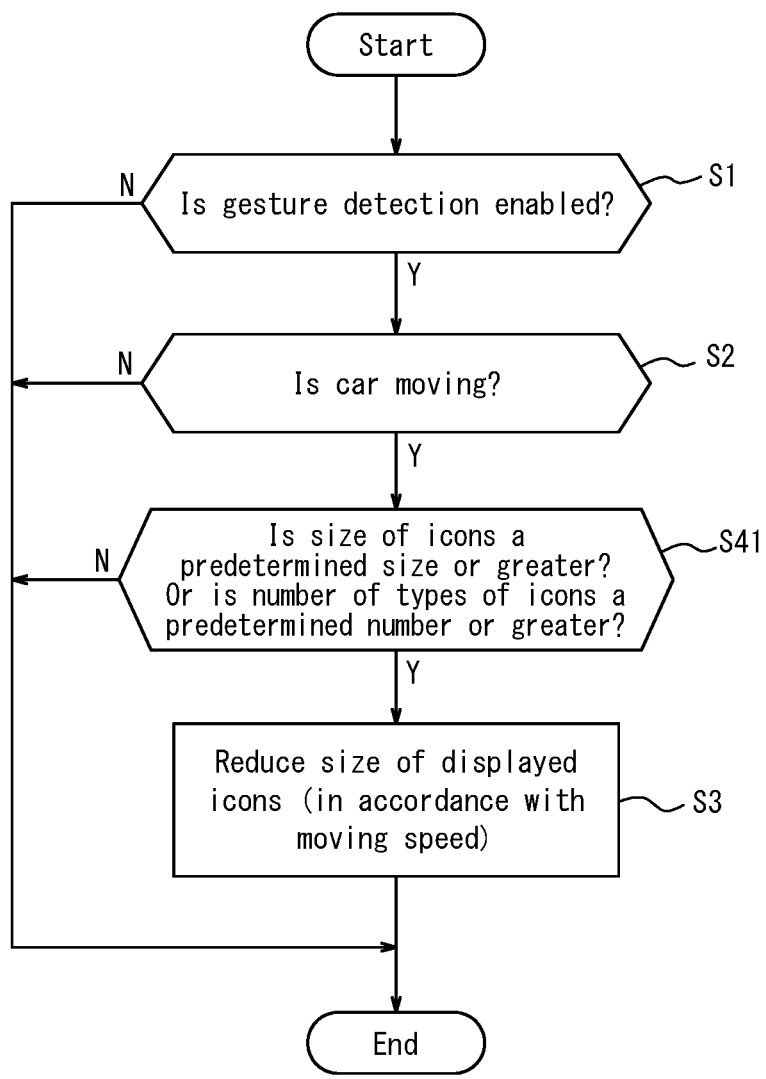
FIG. 12 is a flowchart illustrating an example of processing executed by a controller of an electronic device.

FIG. 12 is a flowchart illustrating another example of processing executed by the controller 11 of the electronic device 1 according to an embodiment. The processing in FIG. 12 can be executed by changing the processing described in FIG. 7.

After the processing in FIG. 12 starts, the controller 11 judges whether gesture detection by the proximity sensor 18 (gesture sensor) is enabled (step S1). When the gesture detection is not enabled in step S1, the controller 11 ends the processing illustrated in FIG. 12. Conversely, when the gesture detection is enabled in step S1, the controller 11 judges whether the car in which the electronic device 1 is mounted is moving (step S2).

When the car is not moving in step S2, the controller 11 ends the processing in FIG. 12. When the car is moving in step S2, the controller 11 judges whether the size of the icons displayed on the display 14 is a predetermined size or greater (step S41). Instead of or in addition to the processing of step S41 in FIG. 12, the controller 11 may judge in step S41 whether the number of types of icons displayed on the display 14 is a predetermined number or greater.

When the size of the icons is a predetermined size or greater, and/or when the number of types of icons is a predetermined number or greater in step S41, the controller 11 reduces the size of the icons displayed on the display 14 (step S3).

When the car is moving in step S2, for example, the controller 11 in an embodiment may reduce the size of the icons, displayed on the display 14, that are larger than a standard size prescribed in advance. In this case, the controller 11 need not reduce the size of icons, displayed on the display 14, that are the standard size or smaller than the standard size.

When the car is moving in step S2, for example, the controller 11 in an embodiment may reduce the size of icons displayed on the display 14 when many types of icons are being displayed. For example, when three types of icons are being displayed on the display 14, such as operation icons, informational icons, and banner icons, the controller 11 may reduce the size of these icons. The controller 11 in this case need not reduce the size of icons displayed on the display 14 when two types of icons are being displayed on the display 14, such as operation icons and informational icons. The controller 11 may reduce the size of icons by reducing the size of at least a portion of icons, for example by only reducing the size of operation icons.

The controller 11 in the electronic device 1 according to an embodiment may thus reduce the size of icons when the size of the icons displayed on the display 14 is a predetermined size or greater. The controller 11 in the electronic device 1 according to an embodiment may also reduce the size of icons when the number of types of the icons displayed on the display 14 is a predetermined number or greater.

If icons are displayed at a large size, or a relatively large number of types of icons are displayed, while the car is moving, these icons are displayed at a smaller size with the electronic device 1 according to an embodiment. The electronic device 1 according to an embodiment can therefore be expected to reduce the user's motivation for performing a touch operation on the display 14 while the car is moving. The electronic device 1 according to an embodiment can thereby improve the driving safety of a moveable body such as a car.

Figure 13:
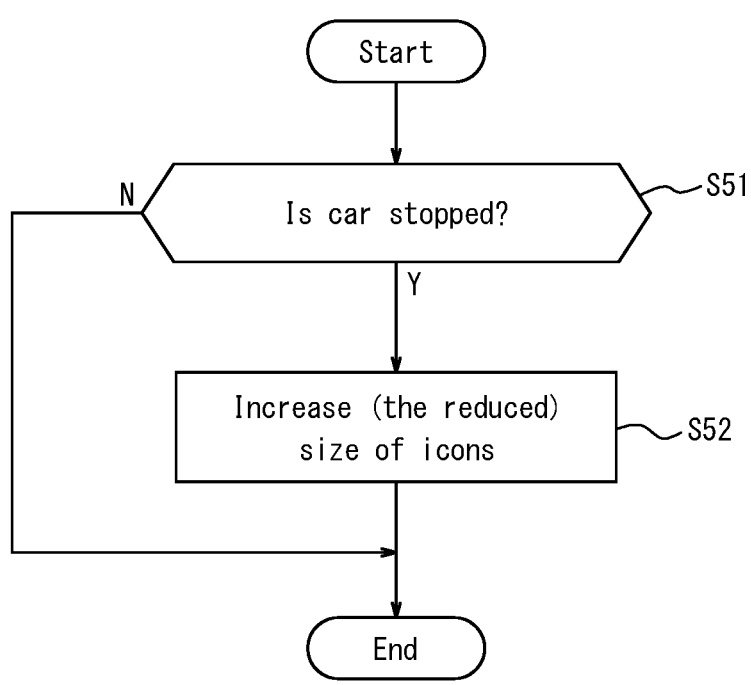
FIG. 13 is a flowchart illustrating an example of processing executed by a controller of an electronic device.

FIG. 13 is a flowchart illustrating another example of processing executed by the controller 11 of the electronic device 1 according to an embodiment. The processing in FIG. 13 can be executed following the processing described in FIGS. 7, 9, 11, and 12.

When the processing in FIG. 13 begins, the controller 11 judges whether the car is stopped (step S51). The controller 11 may judge that the car is stopped in step S51 based on information acquired from the ECU included in the car, for example. Alternatively, the controller 11 may judge that the car is stopped in step S51 based on information acquired from sensors or the like included in the car apart from the ECU, for example. The controller 11 may use any method in step S51 to judge that the car in which the electronic device 1 is mounted is stopped.

When the car is not stopped in step S51, the controller 11 ends the processing in FIG. 13. When the car is stopped in step S51, the controller 11 increases the size of icons displayed on the display 14 (step S52). The controller 11 may, for example, increase the size of icons to their original size in step S52 when the size of the icons has already been reduced in the processing up to this point. The controller 11 may, for example, increase the size of icons to be larger than their original size in step S52 when the size of the icons has already been reduced in the processing up to this point. The controller 11 may, for example, increase the size of icons to a smaller size than their original size in step S52 when the size of the icons has already been reduced in the processing up to this point.

The controller 11 in the electronic device 1 according to an embodiment may thus increase the size of the icons displayed on the display 14 while the car is stopped. In this case, the controller 11 may increase the reduced size of the icons displayed on the display 14. The electronic device 1 according to an embodiment relatively increases the size of icons displayed on the display 14 when the car is stopped. The electronic device 1 according to an embodiment can therefore increase the visibility of icons displayed on the display 14 when the car is stopped. The electronic device 1 according to an embodiment can also facilitate touch operation by the user on the icons displayed on the display 14 when the car is stopped.

Figure 14:
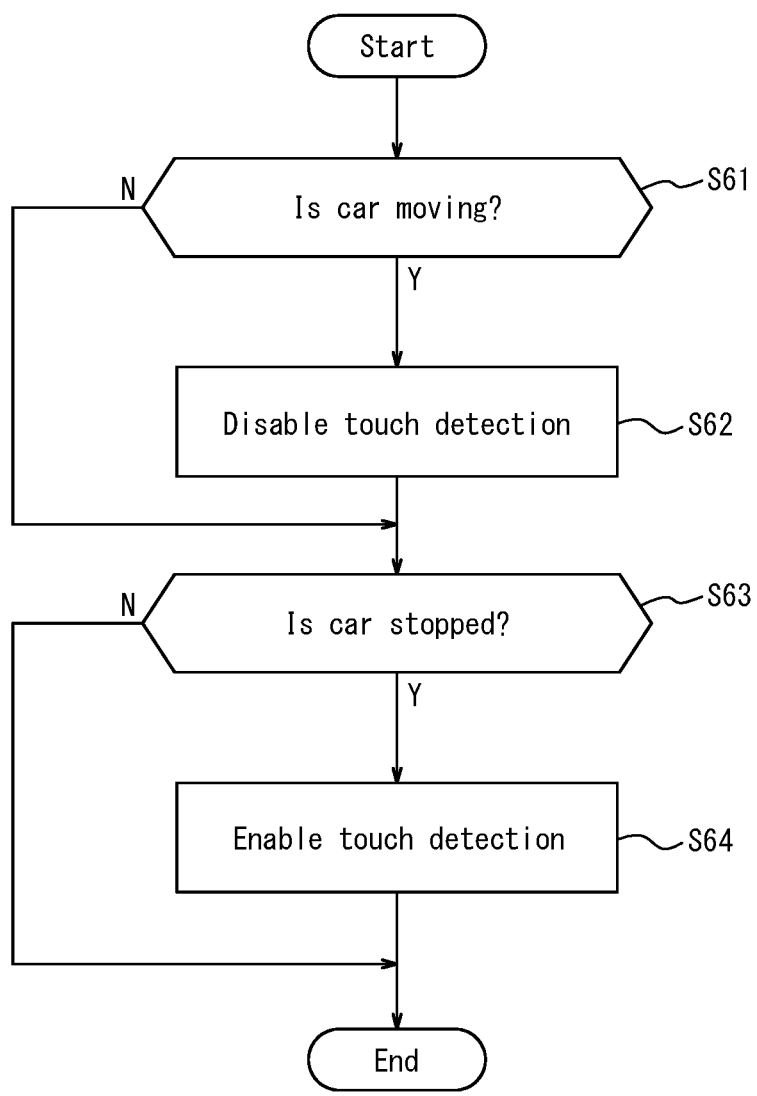
FIG. 14 is a flowchart illustrating an example of processing executed by a controller of an electronic device.

FIG. 14 is a flowchart illustrating another example of processing executed by the controller 11 of the electronic device 1 according to an embodiment. The processing in FIG. 14 can be executed following the processing described in FIGS. 7, 9, 11, 12, and 13. The processing in FIG. 14 may also be executed in parallel with the processing described with reference to FIGS. 7, 9, 11, 12, and 13.

When the processing in FIG. 14 begins, the controller 11 judges whether the car is moving (step S61). The controller 11 may judge whether the car is moving in step S61 in a way similar to step S2 in FIG. 7, for example. When the car is moving in step S61, the controller 11 disables the touch detection by the display 14 (touch sensor) (step S62).

Stating that the touch detection is disabled in step S62 refers to detection, with a touch sensor such as the display 14, of a touch by the user being disabled. Here, the detection of a touch by the user with a touch sensor may be "disabled" by a state such that a predetermined touch by the user is not detected by the sensor. The detection of a touch by the user with a touch sensor may be "disabled" by a state such that a predetermined touch by the user is detected by the sensor, but the controller 11 does not execute predetermined processing in accordance with the detection result. The "touch" referred to here is not limited to a simple "contact" operation. The "touch" may encompass various types of operations performed by contact on the touch sensor (contact on the electronic device), such as a tap, a slide, a swipe, a pinch-in, a pinch-out, or a flick, for example.

The controller 11 executes the processing of step S63 upon the touch detection being disabled in step S62. The controller 11 also executes the processing of step S63 when the car is not moving in step S61.

In step S63, the controller 11 determines whether the car is stopped. The controller 11 may judge whether the car is stopped in step S63 in a way similar to step S51 in FIG. 13, for example. When the car is stopped in step S63, the controller 11 enables the touch detection by the display 14 (touch sensor) (step S64). The touch detection being enabled in step S64 refers to detection of a touch by the user with a touch sensor, such as the display 14, being enabled. Here, detection of a touch by the user with a touch sensor being "enabled" may refer to a state in which the sensor can detect a predetermined touch by the user, and the controller 11 can execute predetermined processing in accordance with the detection result. The "touch" referred to here as well is not limited to a simple "contact" operation. The "touch" may encompass various types of operations performed by contact on the touch sensor (contact on the electronic device), such as a tap, a slide, a swipe, a pinch-in, a pinch-out, or a flick, for example.

The controller 11 ends the processing in FIG. 14 upon the touch detection being enabled in step S64. The controller 11 also ends the processing in FIG. 14 when the car is not stopped in step S64.

The controller 11 in the electronic device 1 according to an embodiment may thus disable detection of a touch with the second sensor while the car is moving. The controller 11 in the electronic device 1 according to an embodiment may also enable the detection of a touch with the second sensor while the car is stopped.

The electronic device 1 according to an embodiment allows the user to perform touch-based operations while the car is stopped. On the other hand, the electronic device 1 according to an embodiment does not allow the user to perform touch-based operations while the car is moving. The electronic device 1 according to an embodiment can therefore be expected to reduce the user's motivation for performing a touch operation on the display 14 while the car is moving. The electronic device 1 according to an embodiment can thereby improve the driving safety of a moveable body such as a car.

In the above embodiments, the detection of a gesture with the gesture sensor being enabled/disabled, and/or the detection of a touch with the touch sensor being enabled/disabled may be associated with the above-described "modes (operation modes)" as appropriate. Detection of a gesture with the gesture sensor may be enabled while detection of a touch with the touch sensor is disabled in the above-described car mode, for example. Detection of a gesture with the gesture sensor and detection of a touch with the touch sensor may both be enabled in modes other than the above-described car mode, for example.

Other Embodiments

Although the present disclosure is based on drawings and embodiments, it is to be noted that various changes and modifications will be apparent to those skilled in the art on the basis of the present disclosure. Therefore, such changes and modifications are to be understood as included within the scope of the present disclosure. For example, the functions and the like included in the various units, steps, and the like may be reordered in any logically consistent way. Furthermore, units, steps, and the like may be combined into one or divided.

In the above embodiment, gestures have been described as being detected by the proximity sensor 18, but gestures do not necessarily have to be detected by the proximity sensor 18. Gestures may be detected by any sensor capable of detecting a gesture by the user without contact on the electronic device 1. Examples of such sensors include the camera 13.

Examples of sensors that can detect a gesture by the user without contact on the electronic device 1 may, for example, include a ranging sensor. For example, the electronic device 1 may include a ranging sensor instead of or in addition to the proximity sensor 18 and may detect a gesture using the ranging sensor.

The ranging sensor is a sensor capable of measuring the distance to an object. The ranging sensor may, for example, be configured as a time of flight (ToF) sensor. The ranging sensor configured as a ToF sensor includes a light emitter that irradiates sinusoidal modulated light (infrared laser light) towards an object and a light receiver that receives reflected light, from the object, of the irradiated infrared laser light. The light receiver includes an image sensor in which a plurality of light-receiving elements are arranged, for example. The ToF sensor measures the time (time-of-flight) from when infrared laser light is irradiated until reflected light is received by the light-receiving elements. The ToF sensor can measure the time-of-flight based on the phase difference between the irradiated infrared laser light and the received reflected light. Based on the measured time-of-flight, the ToF sensor can measure the distance to the object that reflected the irradiated infrared laser light. The ToF sensor can detect the direction of movement of the object from the time difference between when reflected light from the object is incident on each of the light-receiving elements. With a principle similar to the principle described for the proximity sensor 18, the ToF sensor as well can therefore detect a gesture performed by the user. The ranging sensor may be provided on the same surface of the electronic device 1 as the proximity sensor 18, for example.

Figure 15:
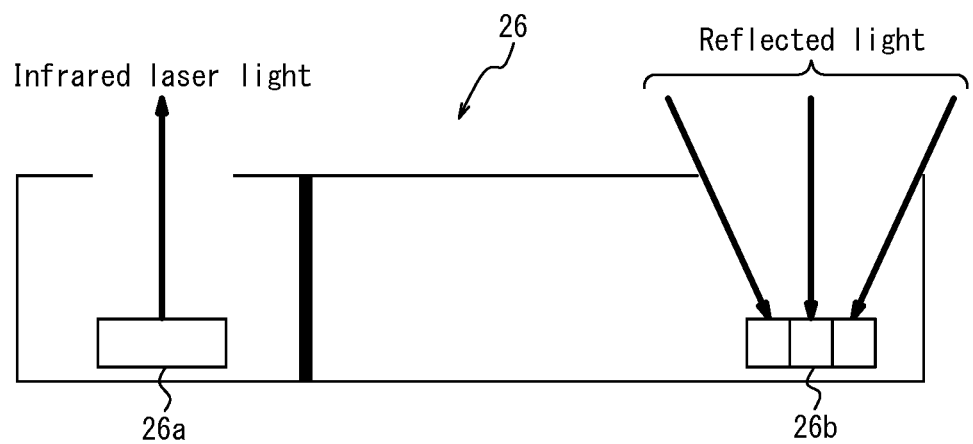
FIG. 15 schematically illustrates a ranging sensor.
Figure 16:
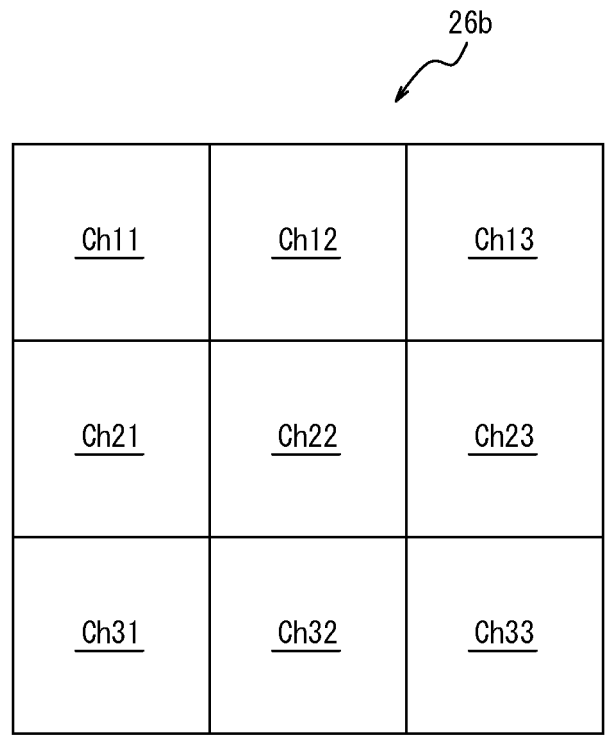
FIG. 16 schematically illustrates an example of arrangement of light-receiving elements in the light receiver illustrated in FIG. 15.
Figure 17:
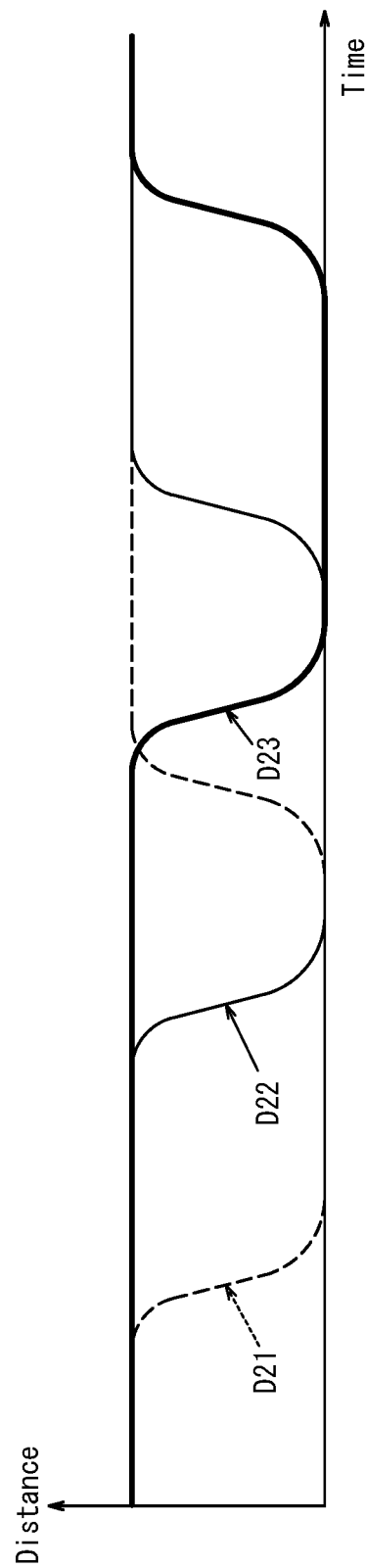
FIG. 17 schematically illustrates the change in distance to an object detected by each light-receiving element.

A method performed by the controller 11 to detect a gesture by the user based on output of the ranging sensor is described below in detail with reference to FIGS. 15 through 17. FIG. 15 schematically illustrates a ranging sensor 26. FIG. 15 is a side view of the ranging sensor 26. The ranging sensor 26 includes a light emitter 26a and a light receiver 26b. The light emitter 26a irradiates infrared laser light towards an object. The light receiver 26b receives reflected light, from the object, of the irradiated infrared light.

The light receiver 26b may include a plurality of light-receiving elements. For example, the light receiver 26b may include nine light-receiving elements arranged in a 3×3 grid, as illustrated in FIG. 16. The nine light-receiving elements each receive reflected light from the object. The three light-receiving elements arranged in the top row of the light receiver 26b are, in order from the left, Ch11, Ch12, Ch13. The three light-receiving elements arranged in the middle row of the light receiver 26b are, in order from the left, Ch21, Ch22, Ch23. The three light-receiving elements arranged in the bottom row of the light receiver 26b are, in order from the left, Ch31, Ch32, Ch33.

The ranging sensor 26 can measure the distance to the object from each of the nine light-receiving elements based on the phase difference between the infrared laser light irradiated by the light emitter 26a and the reflected light received by each of the nine light-receiving elements of the light receiver 26b. The ranging sensor 26 can detect a gesture based on the distance from each of the nine light-receiving elements to the object and the change over time in the distance.

For example, suppose that the user performs a gesture to move a hand from left to right. At this time, the distances to the object detected by the light-receiving elements Ch21, Ch22, Ch23 in the middle row are designated as D21, D22, D23. FIG. 17 schematically illustrates the change in distance to the object detected by each light-receiving element. As illustrated schematically in FIG. 17, for example, the hand that is the object first approaches the light-receiving element Ch21 located on the left side. The distance D21 to the object detected by the light-receiving element Ch21 therefore decreases. Subsequently, the hand that is the object approaches the light-receiving element Ch22 located in the middle, and the distance D22 to the object detected by the light-receiving element Ch22 decreases. Finally, the hand that is the object moves to the right, and the distance D23 to the object detected by the light-receiving element Ch23 located on the right side decreases. The order in which the hand that approached the light-receiving elements Ch21, Ch22, Ch23 moves away is also Ch21, Ch22, Ch23. Consequently, the distances D21, D22, D23 increase in this order (and return to their initial values). A gesture in the up or down direction can also be detected by the same principle using the light-receiving elements Ch12, Ch22, Ch32, for example. The ranging sensor 26 can thus detect a gesture based on the distance from each of the nine light-receiving elements to the object and the change over time in the distance.

The light receiver 26b has been described as including nine light-receiving elements, but the number of light-receiving elements in the light receiver 26b is not limited to this example. The arrangement of the light-receiving elements in FIG. 16 is also not limiting. The number and arrangement of the light-receiving elements in the light receiver 26b may be determined appropriately in accordance with the type of gestures to be detected.

The light emitter 26a of the ranging sensor 26 may include a plurality of light-emitting elements. In this case, the distance to the object from each of the nine light-emitting elements can be measured based on the phase difference between the infrared laser light emitted by each light-emitting element and the reflected light received by the light receiver 26b. By adapting the above-described principle, the ranging sensor 26 can detect a gesture in this case as well based on the distance from each of the nine light-emitting elements to the object and the change over time in the distance.

Figure 18:
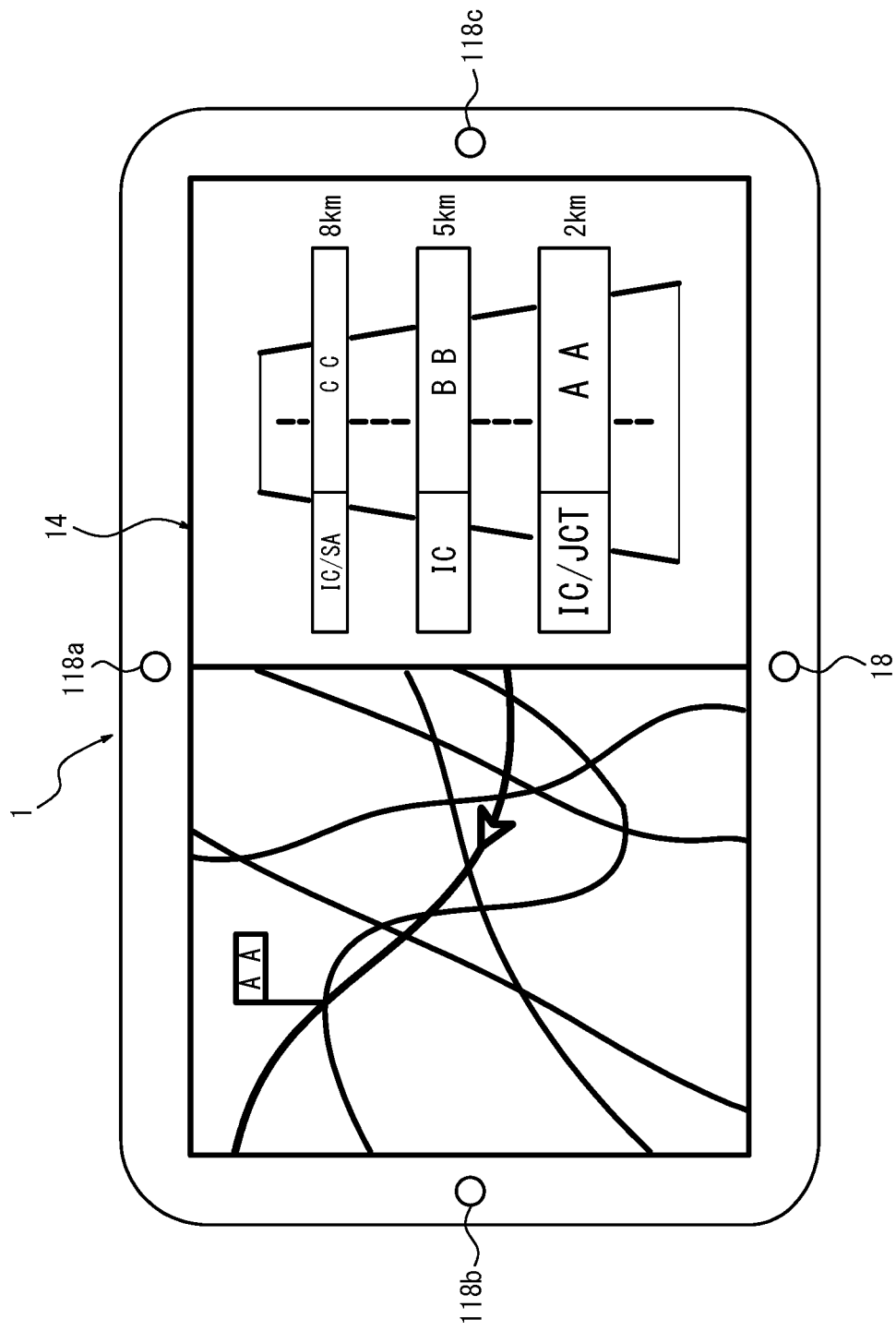
FIG. 18 illustrates another example of arrangement of proximity sensors.

FIG. 18 illustrates another example of arrangement of proximity sensors 18, 118a, 118b, 118c in another embodiment. In the example in FIG. 18, the electronic device 1 includes four proximity sensors 18, 118a, 118b, 118c. The controller 11 can, for example, distinguish gestures more accurately by statistically processing the detected values of the four proximity sensors 18, 118a, 118b, 118c (for example, by calculating an average). If a portion of the proximity sensors 18, 118a, 118b, 118c are unable to output detected values due to failure or the like, the controller 11 can continue to distinguish gestures using the detected values of the other sensors. The proximity sensors 118b, 118c are provided in a housing portion of the electronic device 1, at positions in the central region of the vertical (y-axis direction) sides of the display 14 and further outward (to the left and right) than the display 14 in the horizontal direction (x-axis direction). One of the proximity sensors 118b, 118c is closer to the driver's seat than the other and can therefore detect a gesture by the driver with higher sensitivity. As yet another embodiment, the electronic device 1 may include a portion of the proximity sensors 18, 118a, 118b, 118c of FIG. 18. The electronic device 1 may, for example, include the two proximity sensors 18, 118a. The electronic device 1 may, for example, include the two proximity sensors 118b, 118c. As yet another embodiment, the electronic device 1 may include one proximity sensor at the position of any of the proximity sensors 118a, 118b, and 118c illustrated in FIG. 18. As still another embodiment, at least a portion of the proximity sensors 18, 118a, 118b, 118c need not be positioned at the center on the respective side of the display 14. For example, the proximity sensors 18, 118a, 118b, 118c may be arranged on the outside of the four corners of the display 14.

The above embodiments are not limited to being implemented as the electronic device 1. For example, the above embodiments may be implemented as a control method of a device such as the electronic device 1. Furthermore, the above embodiments may be implemented as a program executed by a device such as the electronic device 1, for example.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a global positioning system (GPS) receiver, and other programmable data processing apparatuses. It should be noted that in each embodiment, various operations or control methods are executed by a dedicated circuit (for example, individual logical gates interconnected in order to execute a particular function) implemented by program instructions (software), or by a logical block and/or program module or the like executed by one or more processors. The one or more processors that execute a logical block, program module, or the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a processor, a controller, a microcontroller, an electronic device, another apparatus designed to be capable of executing the functions disclosed herein, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in any of the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a Compact Disc (CD), Laser Disc®, Digital Versatile Disc (DVD®), Floppy® disk, and Blu-ray Disc® (laser disc, DVD, floppy, and Blu-ray Disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in the present disclosure, the term "memory" refers to all types of long-term storage, short-term storage, and volatile, non-volatile, or other memory. In other words, the "memory" is not limited to a particular type and/or number. The type of medium on which information is stored is not limited, either.

The invention claimed is:

1. An electronic device mountable in a car, the electronic device comprising:
    a first sensor configured to detect a gesture that does not come into contact with the electronic device;
    a second sensor configured to detect a touch that comes into contact with the electronic device; and
    a controller configured to reduce a size of an icon, displayed on a display, when detection by the first sensor is enabled and the car is moving, wherein
    the controller is configured to reduce the size of the icon in a plurality of steps as a speed at which the car is moving increases, each icon size corresponding to a respective speed interval of the car.

2. The electronic device of claim 1, wherein
    the controller is configured to reduce the size of the icon when detection by the first sensor is enabled and there is an incoming phone call while the car is moving.

3. The electronic device of claim 2, wherein
    the controller is configured to hide at least a portion of text information on the display when detection by the first sensor is enabled and there is an incoming phone call while the car is moving.

4. The electronic device of claim 1, wherein
    the controller is configured to reduce the size of the icon when the size of the icon is equal to or greater than a predetermined size.

5. The electronic device of claim 1, wherein
    the controller is configured to reduce the size of the icon when a number of types of the icon is equal to or greater than a predetermined number.

6. The electronic device of claim 1, wherein
    the controller is configured to increase the size of the icon while the car is stopped.

7. The electronic device of claim 6, wherein
    while the car is stopped, the controller is configured to increase the size of the icon whose size was reduced.

8. The electronic device of claim 1, wherein
    the controller is configured to disable detection by the second sensor while the car is moving.

9. The electronic device of claim 8, wherein
    the controller is configured to enable detection by the second sensor while the car is stopped.

10. The electronic device of claim 1, wherein the controller is configured to
    enable detection by the second sensor while the car is stopped;
    disable detection by the second sensor and enable detection by the first sensor while the car is moving; and
    in disabling detection by the second sensor while the car is moving, the controller is configured to reduce the size of the icon only when the size of the icon is equal to or greater than a predetermined size.

11. The electronic device of claim 1, wherein the controller is configured to enable detection by the second sensor while the car is stopped;

disable detection by the second sensor and enable detection by the first sensor while the car is moving; and in disabling detection by the second sensor while the car is moving, the controller is configured to reduce the size of the icon only when a number of types of the icon is equal to or greater than a predetermined number.

12. The electronic device of claim 1, wherein the controller is configured to enable detection by the second sensor while the car is stopped;

disable detection by the second sensor and enable detection by the first sensor while the car is moving;

in disabling detection by the second sensor while the car is moving, the controller is configured to reduce the size of the icon when a number of types of the icon is equal to or greater than a predetermined number and when the size of the icon is equal to or greater than a predetermined size; and in enabling detection by the first sensor while the car is moving, to hide at least a portion of text information on the display when there is an incoming phone call.

13. A control method of an electronic device mountable in a car, the control method comprising:

detecting a gesture that does not come into contact with the electronic device;

detecting a touch that comes into contact with the electronic device; and reducing a size of an icon, displayed on a display, when detection of the gesture is enabled and the car is moving, wherein the size of the icon is reduced in a plurality of steps as a speed at which the car is moving increases, each icon size corresponding to a respective speed interval of the car.

14. A non-transitory computer-readable recording medium storing computer program instructions, which when executed cause an electronic device mountable in a car to:

detect a gesture that does not come into contact with the electronic device;

detect a touch that comes into contact with the electronic device; and reduce a size of an icon, displayed on a display, when detection of the gesture is enabled and the car is moving, wherein the size of the icon is reduced in a plurality of steps as a speed at which the car is moving increases, each icon size corresponding to a respective speed interval of the car.

* * * * *